United States Patent
Liu et al.

(10) Patent No.: US 12,488,555 B2
(45) Date of Patent: Dec. 2, 2025

(54) EFFICIENT OBJECT SEGMENTATION

(71) Applicant: Adobe Inc., San Jose, CA (US)

(72) Inventors: Zichuan Liu, San Jose, CA (US); Xin Lu, Saratoga, CA (US); Mingyuan Wu, Champaign, IL (US)

(73) Assignee: Adobe Inc., San Jose, CA (US)

( * ) Notice: Subject to any disclaimer, the term of this patent is extended or adjusted under 35 U.S.C. 154(b) by 373 days.

(21) Appl. No.: 18/215,551

(22) Filed: Jun. 28, 2023

(65) Prior Publication Data

US 2025/0005884 A1    Jan. 2, 2025

(51) Int. Cl.
*G06V 10/26* (2022.01)
*G06T 7/11* (2017.01)
*G06V 10/82* (2022.01)

(52) U.S. Cl.
CPC ............... *G06V 10/26* (2022.01); *G06T 7/11* (2017.01); *G06V 10/82* (2022.01); *G06T 2207/20104* (2013.01)

(58) Field of Classification Search
CPC .......... G06V 10/26; G06V 10/82; G06T 7/11; G06T 2207/20104; G06T 2207/20016; G06T 2207/20081; G06T 2207/20084
See application file for complete search history.

(56) References Cited

U.S. PATENT DOCUMENTS

| | | | | |
|---|---|---|---|---|
| 10,325,371 B1 * | 6/2019 | Kim | ................. | G06N 3/045 |
| 11,410,315 B2 * | 8/2022 | Homayounfar | ........ | G06V 20/56 |
| 11,587,234 B2 * | 2/2023 | Zhao | .................. | G06T 7/11 |
| 12,347,005 B2 * | 7/2025 | Smith | ................. | G06V 10/82 |
| 2020/0167943 A1 * | 5/2020 | Kim | ................. | G06T 7/579 |
| 2020/0327334 A1 * | 10/2020 | Goren | ................. | G06T 7/194 |
| 2020/0349711 A1 * | 11/2020 | Duke | ................. | G06N 3/045 |

(Continued)

FOREIGN PATENT DOCUMENTS

| | | | | | |
|---|---|---|---|---|---|
| CA | | 3157919 A1 * | 9/2021 | ............. | G06V 20/64 |
| WO | WO-2024053846 A1 * | | 3/2024 | ............. | G06N 3/096 |
| WO | WO-2024112452 A1 * | | 5/2024 | ............. | G06T 7/215 |

OTHER PUBLICATIONS

Araujo, André, et al., "Computing Receptive Fields of Convolutional Neural Networks", Google Research Perception Labs Google Research [retrieved Jan. 31, 2023]. Retrieved from the Internet <https://distill.pub/2019/computing-receptive-fields/>., Nov. 4, 2019, 18 Pages.

(Continued)

*Primary Examiner* — Mia M Thomas
(74) *Attorney, Agent, or Firm* — FIG. 1 Patents

(57) ABSTRACT

In implementations of systems for efficient object segmentation, a computing device implements a segment system to receive a user input specifying coordinates of a digital image. The segment system computes receptive fields of a machine learning model based on the coordinates of the digital image. The machine learning model is trained on training data to generate segment masks for objects depicted in digital images. The segment system processes a portion of a feature map of the digital image using the machine learning model based on the receptive fields. A segment mask is generated for an object depicted in the digital image based on processing the portion of the feature map of the digital image using the machine learning model.

20 Claims, 11 Drawing Sheets

(56) References Cited

U.S. PATENT DOCUMENTS

| | | | |
|---|---|---|---|
| 2021/0042928 A1* | 2/2021 | Takeda | G06N 3/084 |
| 2021/0166400 A1* | 6/2021 | Goel | G06V 10/7747 |
| 2021/0383534 A1* | 12/2021 | Tadross | G06V 10/82 |
| 2021/0390700 A1* | 12/2021 | Lee | G06F 18/25 |
| 2022/0044365 A1* | 2/2022 | Zhang | G06T 3/40 |
| 2022/0156943 A1* | 5/2022 | Zhang | G06V 10/776 |
| 2022/0222832 A1* | 7/2022 | Fu | G06V 10/7715 |
| 2022/0383505 A1* | 12/2022 | Homayounfar | G06V 10/764 |
| 2023/0204424 A1* | 6/2023 | Ranganathan | G06V 20/13 348/144 |
| 2023/0289969 A1* | 9/2023 | Li | G06T 7/10 |
| 2024/0078797 A1* | 3/2024 | Azarian Yazdi | G06V 10/778 |
| 2024/0104831 A1* | 3/2024 | Lin | G06V 10/762 |
| 2024/0169542 A1* | 5/2024 | Borse | G06T 7/10 |
| 2024/0355018 A1* | 10/2024 | Aggarwal | G06T 7/50 |

OTHER PUBLICATIONS

Boykov, Yuri Y, et al., "Interactive Graph Cuts for Optimal Boundary & Region Segmentation of Objects in N-D Images", Proceedings of International Conference on Computer Vision, Vancouver, Canada, vol. 1 [retrieved Jan. 31, 2023]. Retrieved from the Internet <https://www.csd.uwo.ca/~yboykov/Papers/iccv01.pdf>., Jul. 2001, 8 Pages.

Cao, Jiale, et al., "SipMask: Spatial Information Preservation for Fast Image and Video Instance Segmentation", Cornell University arXiv, arXiv.org [retrieved Jan. 31, 2023]. Retrieved from the Internet <https://arxiv.org/pdf/2007.14772.pdf>., Jul. 29, 2020, 17 Pages.

Chen, Xi, et al., "FocalClick: Towards Practical Interactive Image Segmentation", Cornell University arXiv, arXiv.org [retrieved Mar. 15, 2023]. Retrieved from the Internet <https://arxiv.org/pdf/2204.02574.pdf>., Apr. 2022, 10 Pages.

Cheng, Bowen, et al., "Masked-attention Mask Transformer for Universal Image Segmentation", Cornell University arXiv, arXiv.org [retrieved Mar. 15, 2023]. Retrieved from the Internet <https://arxiv.org/pdf/2112.01527.pdf>., Jun. 15, 2022, 20 Pages.

Cheng, Bowen, et al., "Pointly-Supervised Instance Segmentation", Cornell University arXiv, arXiv.org [retrieved Feb. 1, 2023]. Retrieved from the Internet <https://arxiv.org/pdf/2104.06404.pdf>., Jun. 15, 2022, 14 Pages.

Grady, Leo, "Random Walks for Image Segmentation", IEEE Transactions on Pattern Analysis and Machine Intelligence, vol. 28, No. 11 [retrieved Feb. 1, 2023]. Retrieved from the Internet <http://vision.cse.psu.edu/people/chenpingY/paper/grady2006random.pdf>., Nov. 2006, 17 pages.

Gupta, Agrim, et al., "LVIS: A Dataset for Large Vocabulary Instance Segmentation", Cornell University arXiv, arXiv.org [retrieved Mar. 15, 2023]. Retrieved from the Internet <https://arxiv.org/pdf/1908.03195.pdf>., Sep. 15, 2019, 13 Pages.

He, Kaiming, et al., "Deep Residual Learning for Image Recognition", Cornell University arXiv Preprint, arXiv.org [retrieved Aug. 11, 2023]. Retrieved from the Internet <https://arxiv.org/pdf/1512.03385.pdf>., Dec. 10, 2015, 12 pages.

He, Kaiming, et al., "Mask R-CNN", Cornell University arXiv, arXiv.org [retrieved Mar. 15, 2023]. Retrieved from the Internet <https://arxiv.org/pdf/1703.06870.pdf>., Jan. 24, 2018, 12 pages.

Hu, Jie, et al., "ISTR: End-to-End Instance Segmentation with Transformers", Cornell University arXiv, arXiv.org [retrieved Feb. 1, 2023]. Retrieved from the Internet <https://arxiv.org/pdf/2105.00637.pdf>., May 6, 2021, 11 Pages.

Ioffe, Sergey, et al., "Batch Normalization: Accelerating Deep Network Training by Reducing Internal Covariate Shift", Proceedings of the 32nd International Conference on Machine Learning, PMLR [retrieved Mar. 16, 2023]. Retrieved from the Internet <http://proceedings.mlr.press/v37/ioffe15.pdf>., Mar. 2015, 11 pages.

Jang, Won-Dong, et al., "Interactive Image Segmentation via Backpropagating Refinement Scheme", IEEE/CVF [retrieved Mar. 15, 2023]. Retrieved from the Internet <https://openaccess.thecvf.com/content_CVPR_2019/papers/Jang_Interactive_Image_Segmentation_via_Backpropagating_Refinement_Scheme_CVPR_2019_paper.pdf>., Jun. 2019, 10 Pages.

Laradji, Issam, et al., "Proposal-Based Instance Segmentation With Point Supervision", IEEE International Conference on Image Processing [retrieved Feb. 17, 2023]. Retrieved from the Internet <https://ieeexplore.ieee.org/document/9190782>., Oct. 2020, 5 Pages.

Lee, Youngwan, et al., "CenterMask: Real-Time Anchor-Free Instance Segmentation", IEEE/CVF Conference on Computer Vision and Pattern Recognition [retrieved Feb. 1, 2023]. Retrieved from the Internet <https://openaccess.thecvf.com/content_CVPR_2020/papers/Lee_CenterMask_Real-Time_Anchor-Free_Instance_Segmentation_CVPR_2020_paper.pdf>., Apr. 2, 2020, 10 Pages.

Lin, Tsung-Yi, et al., "Feature Pyramid Networks for Object Detection", Cornell University arXiv, arXiv.org [retrieved Feb. 1, 2023]. Retrieved from the Internet <https://arxiv.org/pdf/1612.03144.pdf>., Apr. 19, 2017, 10 pages.

Lin, Tsung-Yi, et al., "Focal Loss for Dense Object Detection", Cornell University arXiv, arXiv.org [retrieved Feb. 1, 2023]. Retrieved from the Internet <https://arxiv.org/pdf/1708.02002.pdf>., Oct. 2017, 10 pages.

Lin, Zheng, et al., "Interactive Image Segmentation With First Click Attention", IEEE/CVF Conference on Computer Vision and Pattern Recognition [retrieved Mar. 15, 2023]. Retrieved from the Internet <https://openaccess.thecvf.com/content_CVPR_2020/papers/Lin_Interactive_Image_Segmentation_With_First_Click_Attention_CVPR_2020_paper.pdf>., Jun. 2020, 10 Pages.

Lin, Tsung-Yi, et al., "Microsoft COCO: Common Objects in Context", Cornell University arXiv, arXiv.org [retrieved Jun. 14, 2023]. Retrieved from the Internet <https://arxiv.org/pdf/1405.0312.pdf>., Feb. 21, 2015, 15 Pages.

Liu, Qin, et al., "PseudoClick: Interactive Image Segmentation with Click Imitation", Cornell University arXiv, arXiv.org [retrieved Feb. 1, 2023]. Retrieved from the Internet <https://arxiv.org/pdf/2207.05282.pdf>., Jul. 27, 2022, 18 Pages.

Long, Jonathan, et al., "Fully Convolutional Networks for Semantic Segmentation", Cornell University arXiv, arXiv.org [retrieved Aug. 1, 2023]. Retrieved from the Internet <https://arxiv.org/pdf/1411.4038.pdf>., Nov. 14, 2014, 10 pages.

Luo, Wenjie, et al., "Understanding the Effective Receptive Field in Deep Convolutional Neural Networks", Cornell University arXiv, arXiv.org [retrieved Feb. 1, 2023]. Retrieved from the Internet <https://arxiv.org/pdf/1701.04128.pdf>., Jan. 25, 2017, 9 Pages.

Mortensen, Eric, et al., "Intelligent Scissors for Image Composition", Proceedings of the 22nnd annual conference on Computer graphics and interactive techniques [retrieved Feb. 1, 2023]. Retrieved from the Internet <https://dl.acm.org/doi/pdf/10.1145/218380.218442>., Jan. 1995, 8 Pages.

Mortensen, Eric N, et al., "Interactive Segmentation with Intelligent Scissors", Graphical Models and Image Processing, 60 [retrieved Feb. 1, 2023]. Retrieved from the Internet <https://citeseerx.ist.psu.edu/document?repid=rep1&type=pdf&doi=492a9a96dc0e1b1493748118e8b9aea85e6a5e10>., Sep. 1998, 48 Pages.

Najibi, Mahyar, et al., "AutoFocus: Efficient Multi-Scale Inference", Cornell University arXiv, arXiv.org [retrieved Feb. 1, 2023]. Retrieved from the Internet <https://arxiv.org/pdf/1812.01600.pdf>., Aug. 1, 2019, 11 Pages.

Rother, Carsten, et al., ""GrabCut": interactive foreground extraction using iterated graph cuts", ACM Transactions on Graphics, vol. 23, No. 3 [retrieved Feb. 1, 2023]. Retrieved from the Internet <https://www.cs.jhu.edu/~ayuille/courses/Stat238-Winter09/paper_siggraph04.pdf>., Aug. 1, 2004, 6 Pages.

Sofiiuk, Konstantin, et al., "F-BRS: Rethinking Backpropagating Refinement for Interactive Segmentation", Proceedings of the IEEE/CVF Conference on Computer Vision and Pattern Recognition [retrieved Mar. 15, 2023]. Retrieved from the Internet <10.1109/CVPR42600.2020.00865>., Jan. 2020, 10 Pages.

Sofiiuk, Konstantin, et al., "Reviving Iterative Training with Mask Guidance for Interactive Segmentation", Cornell University arXiv, arXiv.org [retrieved Mar. 15, 2023]. Retrieved from the Internet <https://arxiv.org/pdf/2102.06583.pdf>., Feb. 12, 2021, 15 Pages.

(56) References Cited

OTHER PUBLICATIONS

Tang, Chufeng , et al., "Active Pointly-Supervised Instance Segmentation", Cornell University arXiv, arXiv.org [retrieved Feb. 2, 2023]. Retrieved from the Internet <https://arxiv.org/pdf/2207.11493.pdf>., Oct. 2022, 22 Pages.

Tian, Zhi , et al., "Conditional Convolutions for Instance Segmentation", Cornell University arXiv, arXiv.org [retrieved Feb. 2, 2023]. Retrieved from the Internet <https://arxiv.org/pdf/2003.05664.pdf>., Jul. 26, 2020, 18 Pages.

Tian, Zhi , et al., "FCOS: A Simple and Strong Anchor-free Object Detector", Cornell University arXiv, arXiv.org [retrieved Feb. 2, 2023]. Retrieved from the Internet <https://arxiv.org/pdf/2006.09214.pdf>., Oct. 12, 2020, 13 Pages.

Wang, Xinlong , "SOLOv2: Dynamic and Fast Instance Segmentation", Cornell University arXiv, arXiv.org [retrieved Feb. 2, 2023]. Retrieved from the Internet <https://arxiv.org/pdf/2003.10152.pdf>., Oct. 23, 2020, 17 Pages.

Xie, Enze , et al., "PolarMask: Single Shot Instance Segmentation with Polar Representation", Cornell University arXiv, arXiv.org [retrieved Feb. 2, 2023]. Retrieved from the Internet <https://arxiv.org/pdf/1909.13226.pdf>., Feb. 26, 2020, 12 Pages.

Xu, Ning , et al., "Deep Interactive Object Selection", Cornell University arXiv, arXiv.org [retrieved Mar. 15, 2023]. Retrieved from the Internet <https://arxiv.org/pdf/1603.04042.pdf>., Mar. 13, 2016, 9 pages.

Yang, Chenhongyi , et al., "QueryDet: Cascaded Sparse Query for Accelerating High-Resolution Small Object Detection", Cornell University arXiv, arXiv.org [retrieved Feb. 2, 2023]. Retrieved from the Internet <https://arxiv.org/pdf/2103.09136.pdf>., Mar. 2021, 10 Pages.

Yu, Fisher , et al., "BDD100K: A Diverse Driving Dataset for Heterogeneous Multitask Learning", Cornell University arXiv, arXiv.org [retrieved Feb. 2, 2023]. Retrieved from the Internet <https://arxiv.org/pdf/1805.04687.pdf>., Apr. 8, 2020, 14 Pages.

Yu, Xiaodong , et al., "SOIT: Segmenting Objects with Instance-Aware Transformers", Cornell University arXiv, arXiv.org [retrieved Feb. 2, 2023]. Retrieved from the Internet <https://arxiv.org/pdf/2112.11037.pdf>., Dec. 23, 2021, 9 Pages.

Zhou, Chong , "Yolact++ Better Real-Time Instance Segmentation", University of California, Davis ProQuest Dissertations Publishing [retrieved Jan. 31, 2023]. Retrieved from the Internet <https://www.proquest.com/openview/aaad4e9492a47049e303472d249779dd/1?pq-origsite=gscholar&cbl=51922&diss=y>., 2020, 6 Pages.

* cited by examiner

EFFICIENT OBJECT SEGMENTATION

BACKGROUND

Object segmentation refers to a machine learning task in which objects depicted in a digital image are separated or segmented by generating pixel-level masks for the objects. The pixel-level masks are generated using a machine learning model such as a convolutional neural network trained on training data to generate pixel-level masks for objects depicted in digital images. Once generated, the pixel-level masks are usable to support a variety of functionality such as removing an object from the digital image, applying edits that change a visual appearance of the object without changing a visual appearance of other objects depicted in the digital image, etc.

SUMMARY

Techniques and systems for efficient object segmentation are described. In an example, a computing device implements a segment system to receive a user input specifying coordinates of a digital image. For example, the coordinates of the digital image are coordinates of a pixel that is included in an object depicted in the digital image. The segment system computes receptive fields for nodes (e.g., artificial neurons) of layers of a machine learning model based on the coordinates of the digital image.

For instance, the machine learning model is trained on training data to generate segment masks for objects depicted in digital images. In an example, the segment system processes a portion of a feature map of the digital image using the machine learning model based on the receptive fields (e.g., a union of the receptive fields). In this example, the segment system generates a segment mask for the object depicted in the digital image based on processing the portion of the feature map of the digital image using the machine learning model.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

DETAILED DESCRIPTION

Overview

Figure 1:
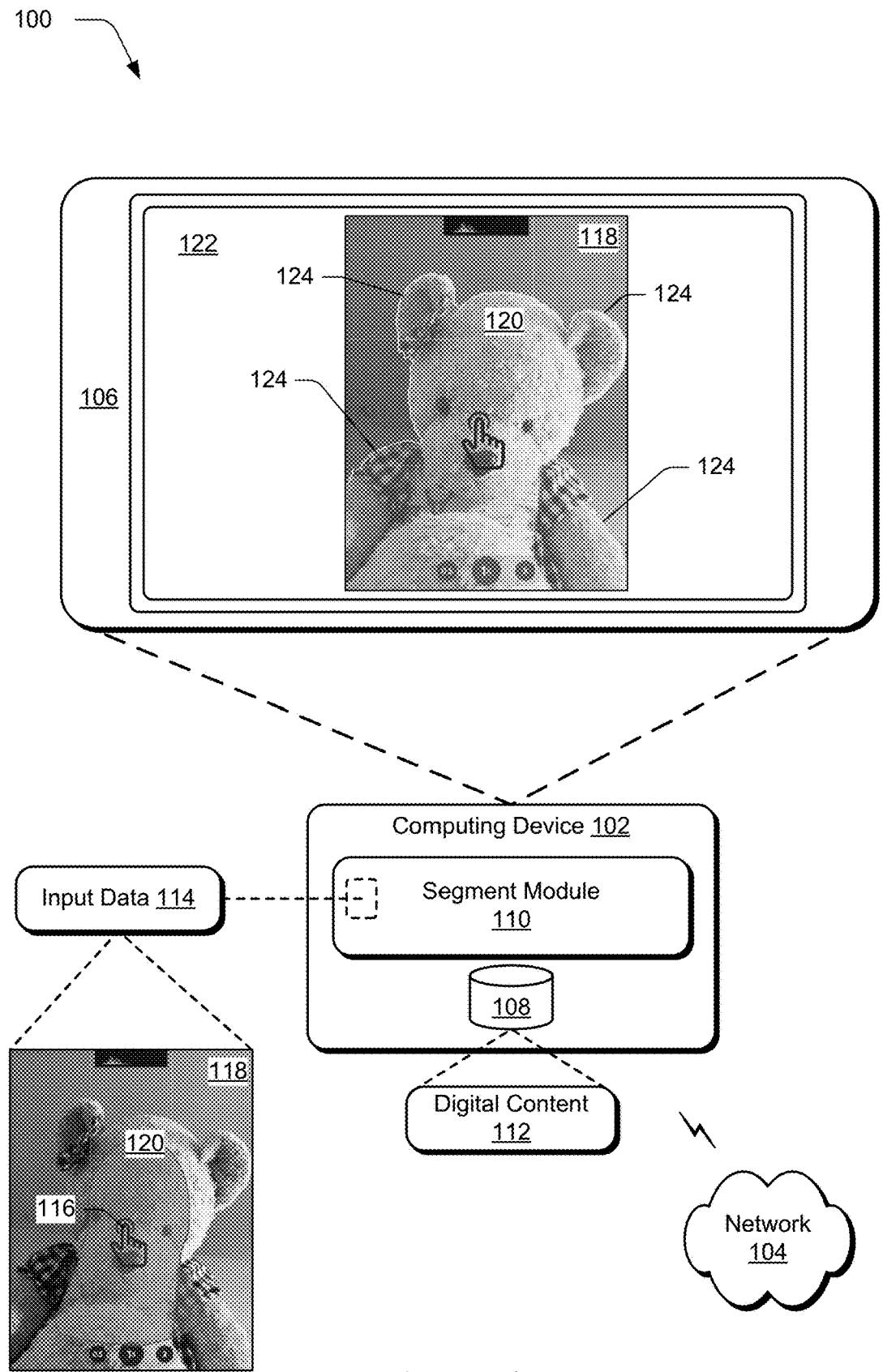
FIG. 1 is an illustration of an environment in an example implementation that is operable to employ digital systems and techniques for efficient object segmentation as described herein.

Single-instance segmentation is a type of object segmentation in which a segment mask is generated for a single object (e.g., of multiple objects) depicted in a digital image using a machine learning model trained on training data to generate segment masks for objects depicted in digital images. Conventional systems for single-instance segmentation process an entire digital image (and corresponding feature map of the digital image) to attend to all objects depicted in the digital image and then generate a segment mask for a particular one of the objects depicted in the digital image. This involves performing computations (e.g., convolutions) for portions of the digital image which are not useful for generating the segment mask for the particular one of the objects which is inefficient. In order to overcome the limitations of conventional systems, techniques and systems for efficient object segmentation are described.

In an example, a computing device implements a segment system to receive a user input specifying coordinates of a digital image. For example, a user interacts with an input device (e.g., a touchscreen, a stylus, a mouse, a keyboard, etc.) relative to the digital image to specify the coordinates as being included in an object depicted in the digital image. In this example, the digital image is displayed in a user interface, and the user manipulates the input device to specify the coordinates in order to segment the object from other portions of the digital image (e.g., other objects depicted in the digital image).

In one example, the segment system generates a feature map of the digital image using a backbone network included in a machine learning model. For instance, the backbone network includes a feature pyramid network and the feature map for the digital image is a multi-level feature pyramid. In order to generate a segment mask for the object depicted in the digital image without processing portions of the digital image and portions of the feature map of the digital image that are not useful for segmenting the object, the segment system uses the coordinates to compute receptive fields for nodes (e.g., artificial neurons) of layers of a convolutional neural network included in the machine learning model.

For example, the convolutional neural network is trained on training data to generate segment masks for objects depicted in digital images. In an example, the segment system performs receptive field tracing to compute the receptive fields by starting at a lowest layer of the convolutional neural network and identifying a first node (or nodes) included in the lowest layer that is activated by (e.g., responds to) a region of the feature map of the digital image which corresponds to the coordinates specified by the user. The segment system uses the first node (or nodes) to trace dependencies of nodes between layers of the network from the lowest layer to a highest layer of the convolutional neural network in order to identify all nodes of the network capable of contributing to an output at the coordinates.

To do so in one example, the segment system computes a first receptive field for the first node (or nodes) of the lowest layer, and then identifies a second node (or nodes) of a second lowest layer of the convolutional neural network that is capable of contributing to an output of the first node (or nodes) of the lowest layer. For example, the segment system identifies the second node (or nodes) by performing receptive field tracing, and then computes a second receptive field for the second node (or nodes). In this example, the segment system continues to perform receptive field tracing to identify nodes of higher layers of the convolutional neural network that are capable of contributing to outputs of nodes of lower layers of the convolutional neural network until a node (or nodes) of the highest layer of the convolutional neural network is identified and a receptive field for the node (or nodes) of the highest layer is computed. It is to be appreciated that the receptive field tracing is more complex for different architectures of the convolutional neural network such as architectures including skip connections between nodes.

After performing receptive field tracing from the lowest layer of the convolutional neural network to the highest layer of the convolutional neural network, the segment system identifies any dependencies between nodes of the higher layers and nodes of the lower layers of the network from the highest layer of the convolutional neural network to the lowest layer of the convolutional neural network. For example, the segment system increases sizes of the receptive fields based on any identified dependencies. The segment system then determines an approximate layer receptive field by computing a union of the receptive fields. In an example, the segment system utilizes the approximate layer receptive field to "crop" out features which are not capable of contributing to an output at the coordinates during an inference performed by the convolutional neural network.

In one example, the segment system generates a segment mask for the object depicted in the digital image by implementing the convolutional neural network using the approximate layer receptive field to avoid processing portions of the digital image or portions of the feature map of the digital image that are not useful for segmenting the object. Because the described systems for efficient object segmentation are capable of avoiding processing portions of digital images and corresponding feature maps which are not useful for segmenting objects depicted in the digital images, segment masks generated by the described systems utilize less processing/memory resources than segment masks generated by conventional systems which are not capable of avoiding processing of entire digital images and corresponding feature maps. For instance, in an evaluation of floating point operations per second at inference, the described systems for efficient object segmentation demonstrated computation reductions of between 43 and 60 percent for instance segmentation tasks relative to the conventional systems for the instance segmentation tasks.

In the following discussion, an example environment is first described that employs examples of techniques described herein. Example procedures are also described which are performable in the example environment and other environments. Consequently, performance of the example procedures is not limited to the example environment and the example environment is not limited to performance of the example procedures.

Example Environment

FIG. 1 is an illustration of an environment 100 in an example implementation that is operable to employ digital systems and techniques as described herein. The illustrated environment 100 includes a computing device 102 connected to a network 104. The computing device 102 is configurable as a desktop computer, a laptop computer, a mobile device (e.g., assuming a handheld configuration such as a tablet or mobile phone), and so forth. Thus, the computing device 102 is capable of ranging from a full resource device with substantial memory and processor resources (e.g., personal computers, game consoles) to a low-resource device with limited memory and/or processing resources (e.g., mobile devices). In some examples, the computing device 102 is representative of a plurality of different devices such as multiple servers utilized to perform operations "over the cloud."

The illustrated environment 100 also includes a display device 106 that is communicatively coupled to the computing device 102 via a wired or a wireless connection. A variety of device configurations are usable to implement the computing device 102 and/or the display device 106. For example, the display device 106 and the computing device 102 are illustrated to be integrated as part of a mobile device such as a smartphone. The computing device 102 includes a storage device 108 and a segment module 110. For instance, the storage device 108 is illustrated to include digital content 112 such as digital images, digital artwork, digital videos, etc.

The segment module 110 is illustrated as having, receiving, and/or transmitting input data 114. As shown, the input data 114 describes a user input specifying coordinates 116 of a digital image 118 that depicts an object 120 which is a teddy bear. For example, a user interacts with an input device (e.g., a mouse, a stylus, a keyboard, a touchscreen, a microphone, etc.) relative to the digital image 118 in order to specify the coordinates 116.

In one example, the user generates the input data 114 by performing a single interaction relative to a user interface 122 of the display device 106 (e.g., by contacting the user interface 122 with a finger or a stylus to specify the coordinates 116). In some examples, the user specifies the coordinates 116 relative to the object 120 in order to segment the object 120. In these examples, by segmenting the object 120 it is possible to remove the object 120 from the digital image 118, to apply editing operations that change visual features of the object 120 without changing visual features of other portions of the digital image 118, and so forth.

In an example, the segment module 110 receives and processes the input data 114 in order to segment the object 120 using a machine learning model that is included in or accessible to the segment module 110. In this example, the machine learning model is trained on training data to segment objects depicted in digital images. As used herein, the term "machine learning model" refers to a computer representation that is tunable (e.g., trainable) based on inputs to approximate unknown functions. By way of example, the term "machine learning model" includes a model that utilizes algorithms to learn from, and make predictions on, known data by analyzing the known data to learn to generate outputs that reflect patterns and attributes of the known data. According to various implementations, such a machine learning model uses supervised learning, semi-supervised learning, unsupervised learning, reinforcement learning, and/or transfer learning. For example, the machine learning model is capable of including, but is not limited to, clustering, decision trees, support vector machines, linear regression, logistic regression, Bayesian networks, random forest learning, dimensionality reduction algorithms, boosting algorithms, transformers, artificial neural networks (e.g., fully-connected neural networks, deep convolutional neural networks, or recurrent neural networks), deep learning, autoregressive models, etc. By way of example, a machine learning model makes high-level abstractions in data by generating data-driven predictions or decisions from the known input data.

It is possible for the segment module 110 to segment the object 120 by processing the digital image 118 in its entirety using the machine learning model; however, processing of the digital image 118 in its entirety is not an efficient technique for segmenting the object 120 because it causes the machine learning model to perform more computations (e.g., convolutions) than necessary to segment the object 120. In an example, the machine learning model includes a convolutional neural network trained on training data to identify instances of objects depicted in digital images by attending to all portions of the digital images. In this example, the machine learning model is also trained on the training data to predict pixel-level masks of identified instances of the objects depicted in the digital images.

Consider another example in which the machine learning model is trained on training data to perform instance segmentation of objects depicted in digital images. For example, the machine learning model processes portions of the digital image 118 other than the object 120 as part of identifying all instances of objects depicted in the digital image 118. Since the coordinates 116 are specified relative to the object 120 in order to segment the object 120, it is not necessary for the machine learning model to process the portions of the digital image 118 that do not depict the object 120.

In order to avoid processing the portions of the digital image 118 which are not useful for segmenting the object 120, the segment module 110 computes receptive fields of nodes (e.g., artificial neurons) of layers of the machine learning model based on the coordinates 116 of the digital image 118. In an example, the segment module 110 generates a feature map (e.g., an output feature map) of the digital image 118 by processing the digital image 118 using a backbone network such as a feature pyramid network. For example, using the coordinates 116 and the feature map of the digital image 118, the segment module 110 identifies a node (or nodes) of a lowest layer of the machine learning model that is activated by (e.g., responds to) a region of the feature map which corresponds to the coordinates 116.

The segment module 110 computes a first receptive field (e.g., a size of the first receptive field based on a size of a filter and a stride) for the node (or nodes) of the lowest layer of the machine learning model, and the segment module 110 performs receptive field tracing to identify a node (or nodes) of a second lowest layer of the machine learning model that is capable of contributing to an output of the node (or nodes) of the lowest layer of the machine learning model. For instance, the segment module 110 computes a second receptive field (e.g., a size of the second receptive field based on the filter and the stride) for the node (or nodes) of the second lowest layer of the machine learning model. In an example, the segment module 110 adds the second receptive field to the first receptive field, and then the segment module 110 performs receptive field tracing to identify a node (or nodes) of a third lowest layer of the machine learning model that is capable of contributing to an output of the node (or nodes) of the second lowest layer of the machine learning model. The segment module 110 repeats this process for each layer of the machine learning model.

For example, after performing receptive field tracing and computing receptive field sizes for nodes from the lowest layer of the machine learning model to a highest layer of the machine learning model (e.g., tracing from the feature map of the digital image 118 to the digital image 118 as an input to the machine learning model), the segment module 110 uses the computed receptive field sizes to avoid performing computations for features which are not capable of contributing to an output at the coordinates 116. In this example, the segment module 110 computes a union of the receptive field sizes and uses the computed union to "crop" out the features which are not capable of contributing to the output at the coordinates 116 during an inference performed by the machine learning model. To do so in one example, the segment module 110 determines whether any dependencies (e.g., between nodes of layers of the machine learning model from the highest layer to the lowest layer) necessitate a larger field than the union and the segment module 110 computes an approximate layer receptive field for use during the inference performed by the model. The segment module 110 does not process feature values that are outside of the approximate layer receptive field during the inference performed by the machine learning model in order to segment the object 120.

In this manner, the segment module 110 processes a portion of the feature map of the digital image 118 instead of an entirety of the feature map of the digital image 118 in order to generate a segment mask 124 for the object 120 depicted in the digital image 118. By not processing the portions of the digital image 118 which are not useful for segmenting the object 120, the segment module 110 is capable of generating the segment mask 124 in less time and using less computational/memory resources than conventional systems which process an entirety of the digital image 118 in order to generate the segment mask 124. This improvement facilitates performance of instance segmentation tasks in examples in which the computing device 102 is a low-resource device with limited memory and/or processing resources such as a mobile device.

Figure 2:
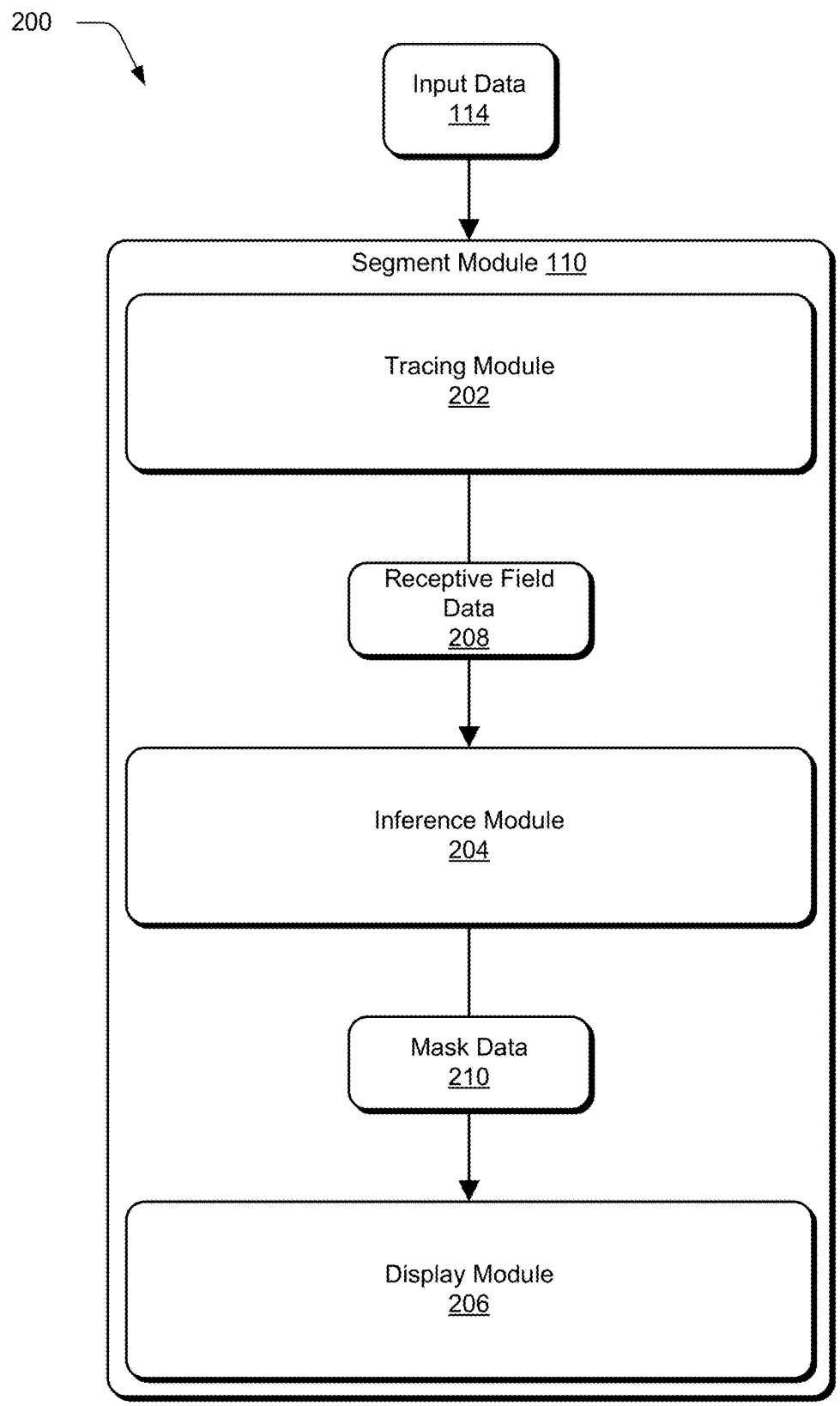
FIG. 2 depicts a system in an example implementation showing operation of segment module for efficient object segmentation.

FIG. 2 depicts a system 200 in an example implementation showing operation of segment module 110. The segment module 110 is illustrated to include a tracing module 202, an inference module 204, and a display module 206. In one example, the tracing module 202 receives and processes the input data 114 in order to generate receptive field data 208.

Figure 3:
FIG. 3 illustrates a representation of examples of input data.

FIG. 3 illustrates a representation 300 of examples of input data 114. As shown in the representation 300, the input data 114 describes a digital image 302 which depicts multiple different objects in three examples 304-308. In a first example 304, a user manipulates an input device (e.g., a mouse, a touchscreen, a stylus, a keyboard, a microphone, etc.) relative to the digital image 302 to specify coordinates 310 of a first object depicted in the digital image 302. For example, the first object is a stuffed animal.

In a second example 306, the user manipulates the input device relative to the digital image 302 to specify coordinates 310 of a second object depicted in the digital image 302. For instance, the second object is a stuffed character. In a third example 308, the user manipulates the input device relative to the digital image 302 to specify coordinates 310 of a third object which is a pumpkin depicted in the digital image 302.

Figure 4:
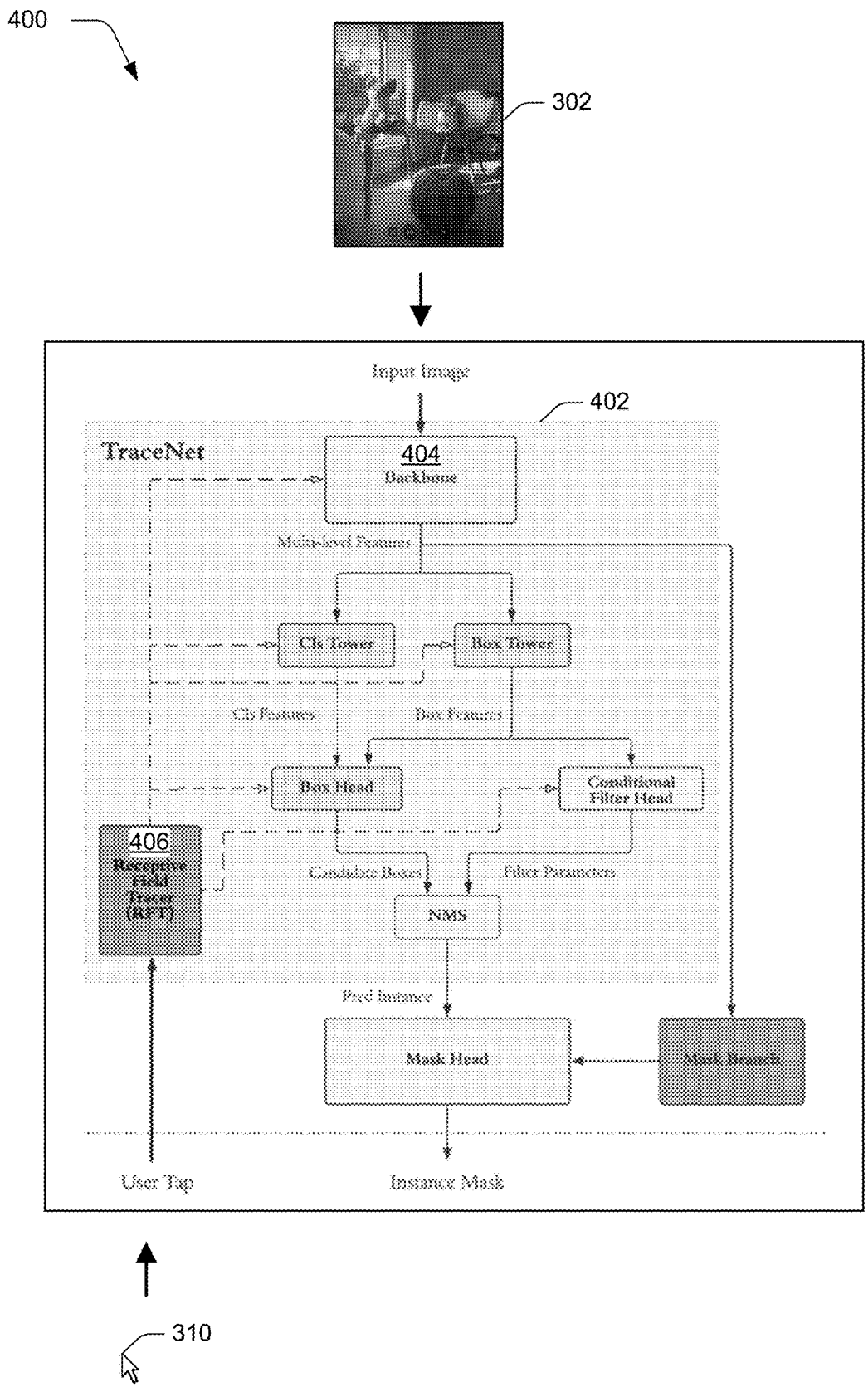
FIG. 4 illustrates a representation of a machine learning model.

FIG. 4 illustrates a representation 400 of a machine learning model 402. In an example, the machine learning model 402 is included in the segment module 110. In another example, the machine learning model 402 is accessible to the segment module 110 such as via the network 104. The machine learning model 402 includes a convolutional neural network in some examples such as ResNet-101, ResNet-50, etc. In other examples, the machine learning model 402 includes a machine learning model trained on training data to segment instances of objects depicted in digital images.

For example, the machine learning model 402 includes a backbone network 404 which is capable of generating feature maps of digital images. In one example, the backbone network 404 includes a feature pyramid network which processes the digital image 302 and generates a feature map of the digital image 302 by extracting a multi-level feature pyramid over the convolutional neural network (e.g., ResNet-101, ResNet-50, etc.) included in the machine learning model 402. In this example, each level of the feature pyramid is used to extract local features around the coordinates 310 at different scales.

The tracing module 202 receives the input data 114 as describing the digital image 302 and the coordinates 310, and the tracing module 202 processes the input data 114 using a receptive field tracer 406. For instance, the receptive field tracer 406 is included in or available to the tracing module 202. In an example, the tracing module 202 utilizes the receptive field tracer 406 to perform receptive field tracing for nodes (e.g., artificial neurons) of layers of the convolutional neural network included in the machine learning model 402 based on the digital image 302 and the coordinates 310 described by the input data 114. For example, the tracing module 202 computes a feature map of the digital image 302 using the backbone network 404 as part of performing the receptive field tracing.

In one example, the tracing module 202 defines a receptive field region for an n-layer convolutional neural network by assuming pixels on each layer are indexed by (i,j), with an upper-left most pixel at (0,0). In this example, the tracing module 202 denotes an (i,j)th pixel on a pth layer as $x_{i,j}^p$ where $p \in [n]$ and $x_{i,j}^0$ denotes a pixel value of the digital image 302 and $x_{i,j}^n$ denotes an output from the n-layer convolutional neural network. The tracing module 202 defines a p-layer receptive field region $r^p$ of $x_{i,j}^n$ as including a set of all units in an output feature map of a pth layer $x^p$ that contribute to $x_{i,j}^n$ for any $p \in [n]$.

For example, the tracing module 202 defines a feature map $f_p$ as an output feature map of a pth layer for a convolutional neural network having P layer operations. For any $p \in [P-1]$, the tracing module 202 determines a recursive and invertible mapping function that maps $r^{p+1}$ with respect to $f_{p+1}$ to $r^p$ with respect to $f_p$ based on a type of layer (p+1) and a list of parameters $A_{p+1}$ that characterize the layer (p+1). In an example, this is representable as:

$$r^p = F(r^{p+1}, A_{p+1})$$

where: F represents the mapping function.

In some examples, the tracing module 202 defines additional parameters as:

$$A_p = [k_p, s_p, q_p, \alpha]$$

where: $k_p$ represents kernel size; $s_p$ represents stride; $q_p$ represents padding; and $\alpha$ represents a dilation factor.

The tracing module 202 denotes $u_p$ and $v_p$ as left-most and right-most zero-indexed coordinates of $r_p$ with respect to $f_p$ in order to represent:

$$u_p = -q_{p+1} + u_{p+1} \cdot s_{p+1}$$
$$v_p = -q_{p+1} + v_{p+1} \cdot s_{p+1} + \alpha(k_{p+1} - 1)$$

Figure 5:
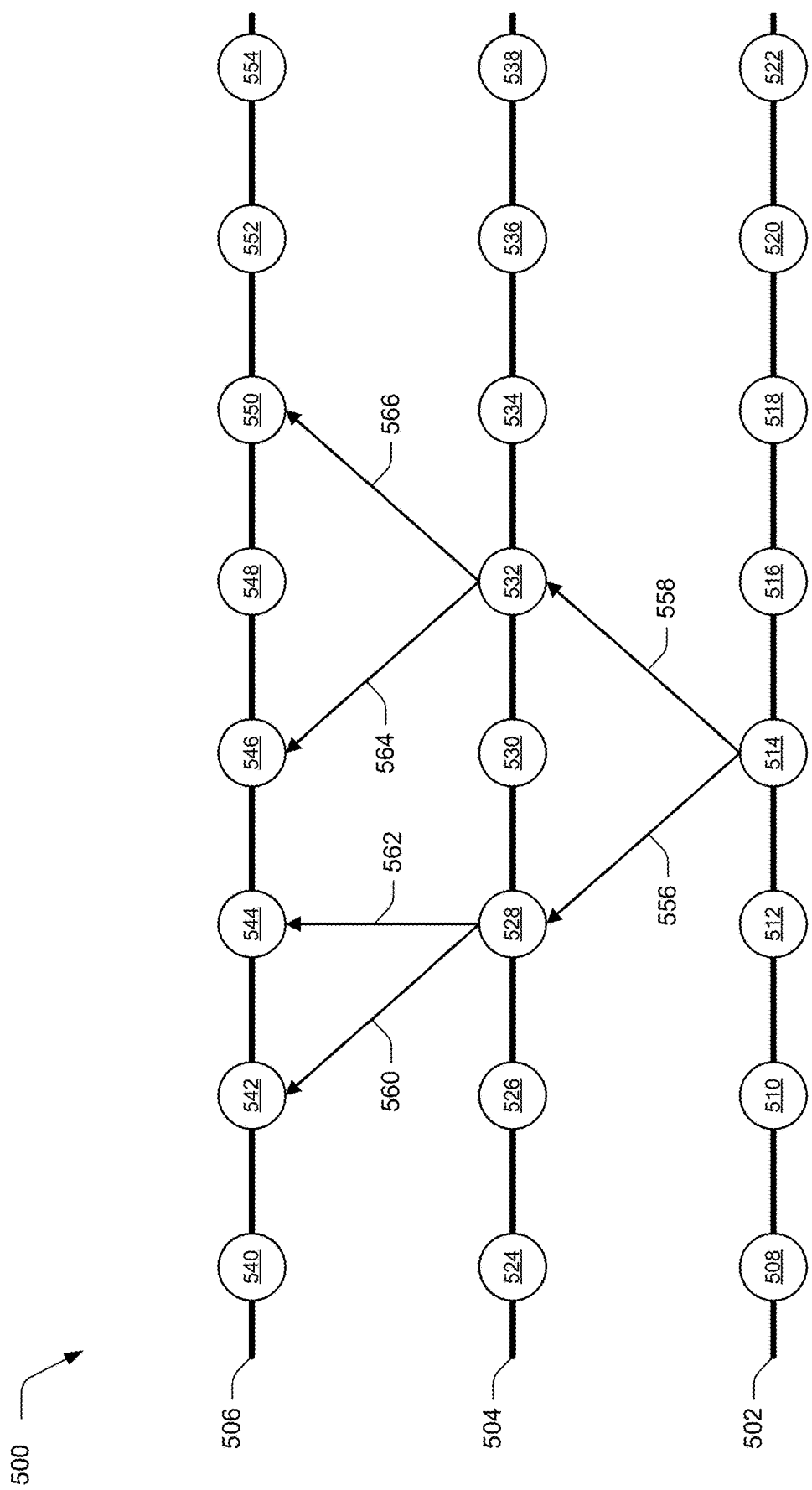
FIG. 5 illustrates a representation of computing receptive fields for nodes of layers of a machine learning model.

FIG. 5 illustrates a representation 500 of computing receptive fields for nodes of layers of a machine learning model. For instance, the representation 500 includes a lowest layer 502, an intermediate layer 504, and a highest layer 506 of the convolutional neural network that is included in the machine learning model 402. As shown, the lowest layer 502 includes nodes 508-522 (e.g., artificial neurons); the intermediate layer 504 includes nodes 524-538; and the highest layer 506 includes nodes 540-554.

For example, the tracing module 202 utilizes the digital image 302 the feature map of the digital image 302 (e.g., generated using the backbone network 404), and the coordinates 310 to identify a node 514 of the lowest layer 502 as being activated by (e.g., responding to) a region of the feature map of the digital image 302 that corresponds to the coordinates 310. The tracing module 202 computes a receptive field for the node 514 and performs receptive field tracing using the receptive field tracer 406 to identify nodes 528, 532 of the intermediate layer 504 as being capable of contributing to an output of the node 514. In an example, the tracing module 202 determines a dependency 556 between the node 514 and the node 528 and also a dependency 558 between the node 514 and the node 532.

In an example, the tracing module 202 performs receptive field tracing using the receptive field tracer 406 to identify nodes 542, 544 of the highest layer 506 as being capable of contributing to an output of the node 528. In this example, the tracing module determines a dependency 560 between the node 528 and the node 542 and a dependency 562 between the node 528 and the node 544. In an example, the tracing module 202 uses the receptive field tracer 406 to identify nodes 546, 550 of the highest layer 506 as being capable of contributing to an output of the node 532. The tracing module 202 determines a dependency 564 between the node 532 and the node 546 and also determines a dependency 566 between the node 532 and the node 550.

Figure 6:
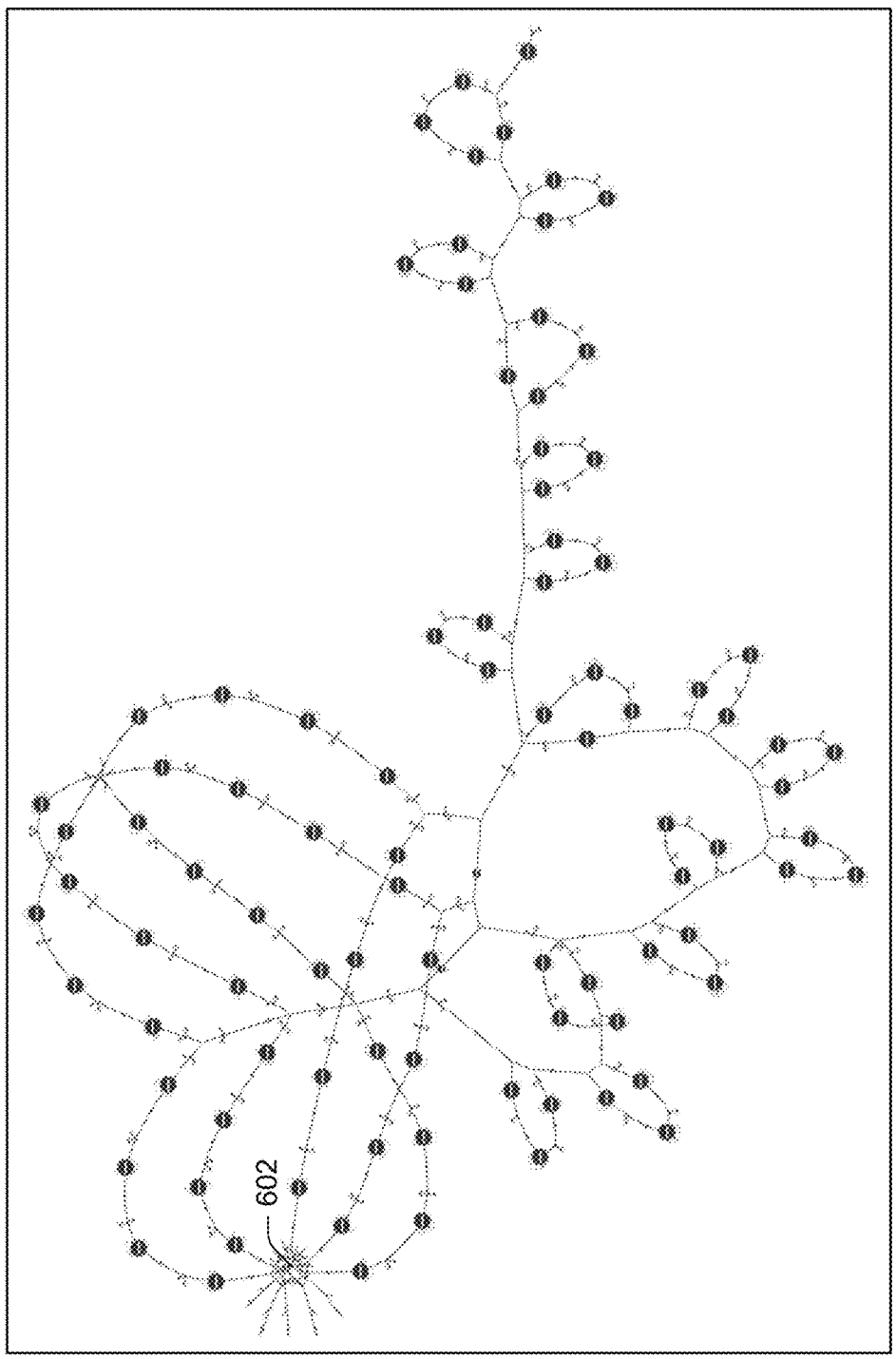
FIG. 6 illustrates a representation of a computational graph for efficient object segmentation.

FIG. 6 illustrates a representation 600 of a computational graph for efficient object segmentation. As shown in the representation 600, the computational graph visually illustrates dependencies between nodes of layers of the convolutional neural network from an origin 602. Although the dependencies 556-566 illustrate liner dependencies in one example, it is to be appreciated that in other examples, the dependencies 556-566 are non-linear and include skip connections which bypass, e.g., the intermediate layer 504. The computational graph included in the representation 600 illustrates dependencies between nodes of layers of an example ResNet-50 architecture.

Figure 7:
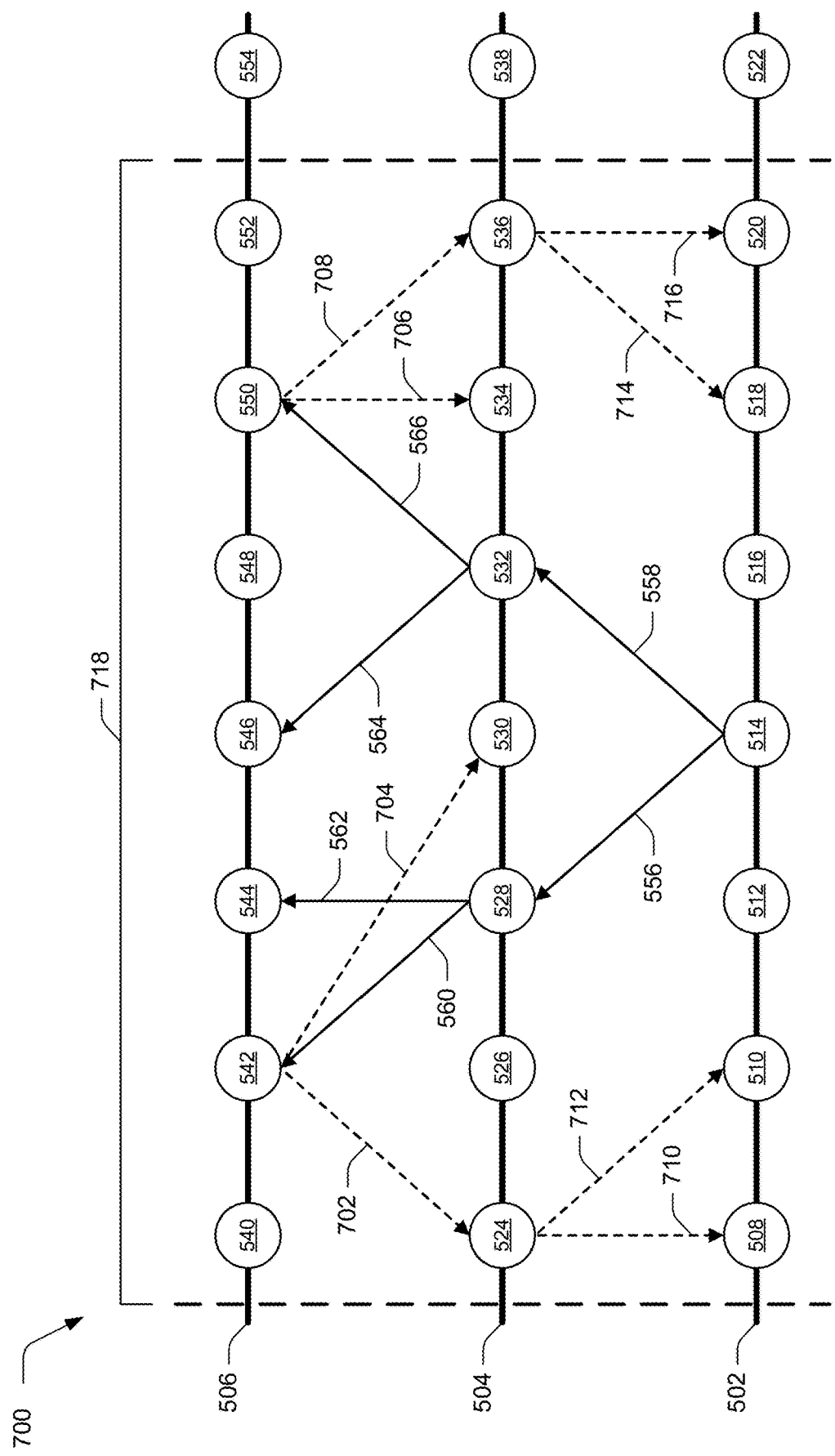
FIG. 7 illustrates a representation of processing a portion of a feature map of a digital image using a machine learning model.

FIG. 7 illustrates a representation 700 of processing a portion of a feature map of a digital image using a machine learning model. The representation 700 includes the lowest layer 502, the intermediate layer 504, and the highest layer 506 of the convolutional neural network that is included in the machine learning model 402. The tracing module 202 uses the receptive field tracer 406 to identify a dependency 702 between the node 542 of the highest layer 506 and node 524 of the intermediate layer 504 and also to identify a dependency 704 between the node 542 and node 530 of the intermediate layer 504.

For example, the tracing module 202 identifies a dependency 706 between the node 550 of the highest layer 506 and node 534 of the intermediate layer 504. In this example, the tracing module 202 also identifies a dependency 708 between the node 550 and node 536 of the intermediate layer 504. For instance, the tracing module 202 identifies a dependency 710 between the node 524 and node 508 of the lowest layer 502 and also a dependency 712 between the node 524 and node 510 of the lowest layer 502. Similarly, the tracing module 202 identifies a dependency 714 between the node 536 and node 518 of the lowest layer 502, and the tracing module 202 also identifies a dependency 716 between the node 536 and node 520 of the lowest layer 502.

As shown in the representation 700, the tracing module 202 determines an approximate layer receptive field 718 by computing unions of receptive fields computed for the nodes 508-554. In one example, this is representable as:

$$r^p = \bigcup_{l \in [m]} F(r^{p^l}, A_{p^l})$$

where: F represents the recursive and invertible mapping function that maps receptive regions of child nodes to receptive field regions with respect to a current feature map based on a type of child layer operation such as Convolution, Activation, Pooling, Normalization, Interpolation, etc.

Figure 8:
FIG. 8 illustrates a representation of segment masks generated for objects depicted in a digital image.

For example, the tracing module 202 generates the receptive field data 208 as describing the approximate layer receptive field 718. In an example, the inference module 204 receives and processes the receptive field data 208 in order to perform efficient object segmentation with respect to the digital image 302. FIG. 8 illustrates a representation 800 of segment masks generated for objects depicted in a digital image.

As shown, the representation 800 includes the first example 304, the second example 306, and the third example 308. In the first example 304 in which the user specified the coordinates 310 relative to the first object depicted in the digital image 302, the inference module 204 utilizes the approximate layer receptive field 718 to generate a first segment mask 802 for the first object without processing portions of the digital image 302 or portions of the feature map of the digital image 302 that are not useful for segmenting the first object using the convolutional neural network included in the machine learning model 402. To do so in one example, the inference module 204 utilizes the approximate layer receptive field 718 such that for any p-layer and any child node $p^l$ of the p-layer, a receptive field region controller "crops" the feature map with a memorized output from F and pads a memorized padding value at four borders for next-layer feature computation in $p^l$.

In the second example 306 in which the user specified the coordinates 310 relative to the second object depicted in the digital image 302, the inference module 204 generates a second segment mask 804 for the second object and uses the approximate layer receptive field 718 to generate the second segment mask 804 without processing portions of the digital image 302 or portion of the feature map of the digital image 302 that are not useful for segmenting the second object. In an example, the inference module 204 generates the second segment mask 804 using the convolutional neural network that is included in the machine learning model 402. In the third example 308 in which the user specified the coordinates 310 relative to the third object depicted in the digital image 302, the inference module 204 implements the convolutional neural network included in the machine learning model 402 to generate a third segment mask 806 for the third object. For instance, the inference module 204 generates the third segment mask 806 by using the approximate layer receptive field 718 to avoid processing portions of the digital image 302 or portions of the feature map of the digital image 302 which are not useful for segmenting the third object.

The inference module 204 generates mask data 210 describing the first segment mask 802, the second segment mask 804, and the third segment mask 806. For example, the display module 206 receives and processes the mask data 210 to generate an indication of the first segment mask 802, an indication of the second segment mask 804, and an indication of the third segment mask 806 for display in the user interface 122 of the display device 106. By performing receptive field tracing to compute receptive fields for nodes of layers of the convolutional neural network and using the computed receptive fields to avoid causing the convolutional neural network to perform unnecessary computations (e.g., convolutions), the described systems for efficient object segmentation are capable of generating segment masks for objects depicted in digital images in less time and using less computational and memory resources than conventional systems that process a digital image in its entirety in order to identify and segment objects depicted in the digital image.

In an example evaluation of floating point operations per second at inference of the described systems for efficient object segmentation relative to conventional systems utilizing a feature pyramid network as the backbone network 404 and ResNet-50 as the convolutional neural network, the described systems reduced computations by about 60.2 percent compared to the conventional systems. In a similar evaluation between the described systems for efficient object segmentation and the conventional systems using ResNet-101 as the convolutional neural network, the described systems reduced floating point operations per second at inference by about 43.6 percent compared to the conventional systems.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable individually, together, and/or combined in different ways. Thus, individual functionality, features, and concepts described in relation to different example environments, devices, components, figures, and procedures herein are usable in any suitable combinations and are not limited to the particular combinations represented by the enumerated examples in this description.

Example Procedures

Figure 9:
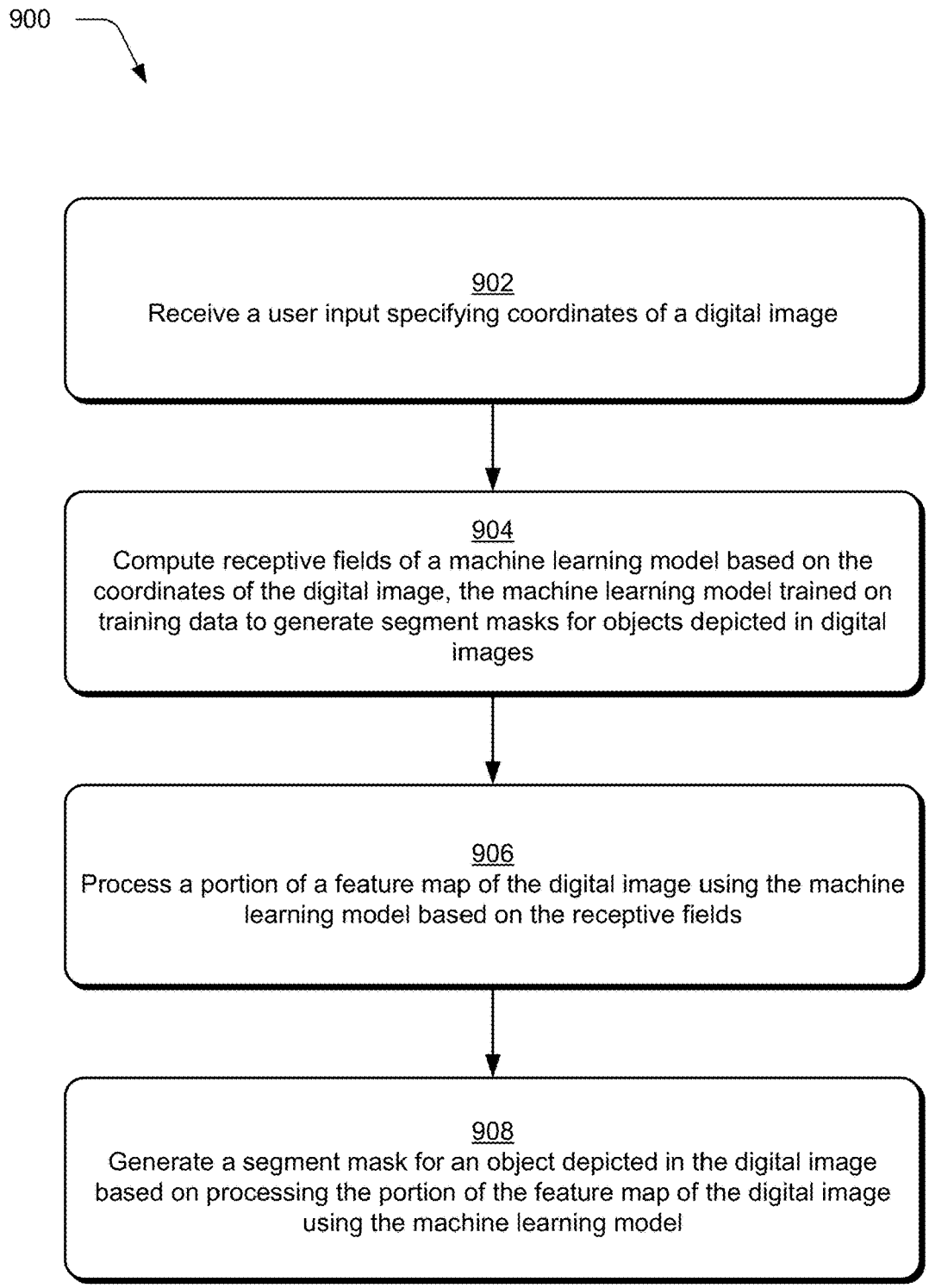
FIG. 9 is a flow diagram depicting a procedure in an example implementation in which receptive fields of a machine learning model are computed based on coordinates of a digital image.

The following discussion describes techniques which are implementable utilizing the previously described systems and devices. Aspects of each of the procedures are implementable in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-8. FIG. 9 is a flow diagram depicting a procedure 900 in an example implementation in which receptive fields of a machine learning model are computed based on coordinates of a digital image.

A user input is received specifying coordinates of a digital image (block 902). For example, the computing device 102 implements the segment module 110 to receive the user input. Receptive fields of a machine learning model are computed based on the coordinates of the digital image, and the machine learning model is trained on training data to generate segment masks for objects depicted in digital images (block 904). In one example, the segment module 110 computes the receptive fields of the machine learning model.

A portion of a feature map of the digital image is processed using the machine learning model based on the receptive fields (block 906). In some examples, the computing device 102 implements the segment module 110 to process the portion of the feature map of the digital image using the machine learning model. A segment mask is generated for an object depicted in the digital image based on processing the portion of the feature map of the digital image using the machine learning model (block 908). In an example, the segment module 110 generates the segment mask for the object depicted in the digital image.

Figure 10:
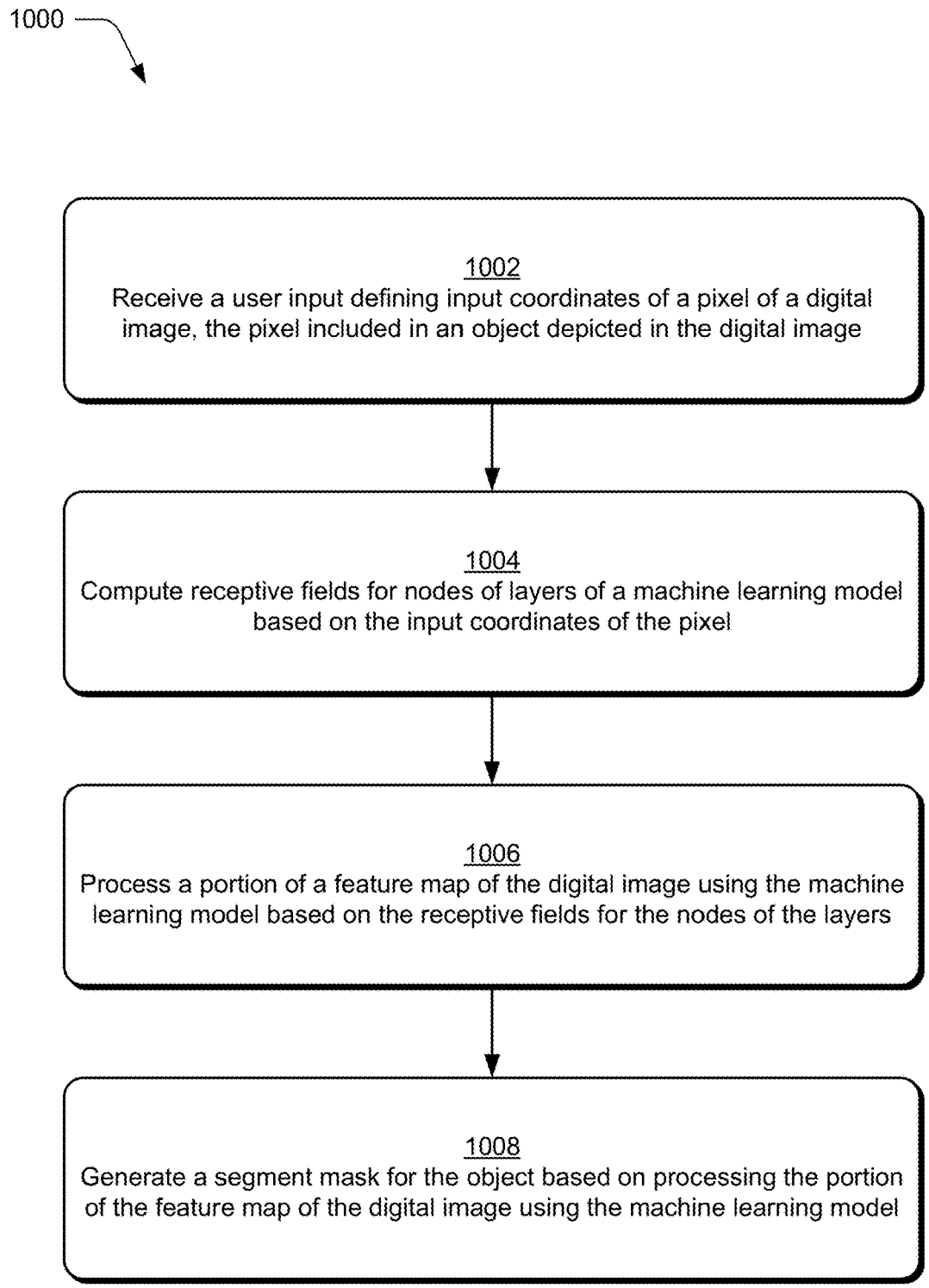
FIG. 10 is a flow diagram depicting a procedure in an example implementation in which a segment mask is generated for an object depicted in a digital image based on processing a portion of a feature map of the digital image using a machine learning model.

FIG. 10 is a flow diagram depicting a procedure 1000 in an example implementation in which a segment mask is generated for an object depicted in a digital image based on processing a portion of a feature map of the digital image using a machine learning model. A user input defining input coordinates of a pixel of a digital image is received, and the pixel is included in an object depicted in the digital image (block 1002). For example, the computing device 102 implements the segment module 110 to receive the user input defining the input coordinates of the pixel of the digital image.

Receptive fields for nodes of layers of a machine learning model are computed based on the input coordinates of the pixel (block 1004). In some examples, the segment module 110 computes the receptive fields for the nodes of the layers of the machine learning model. A portion of a feature map of the digital image is processed using the machine learning model based on the receptive fields for the nodes of the layers (block 1006). In one example, the segment module 110 processes the portion of the feature map of the digital image using the machine learning model. A segment mask is generated for the object based on processing the portion of the feature map of the digital image using the machine learning model (block 1008). The segment module 110 generates the segment mask for the object in an example.

Example System and Device

Figure 11:
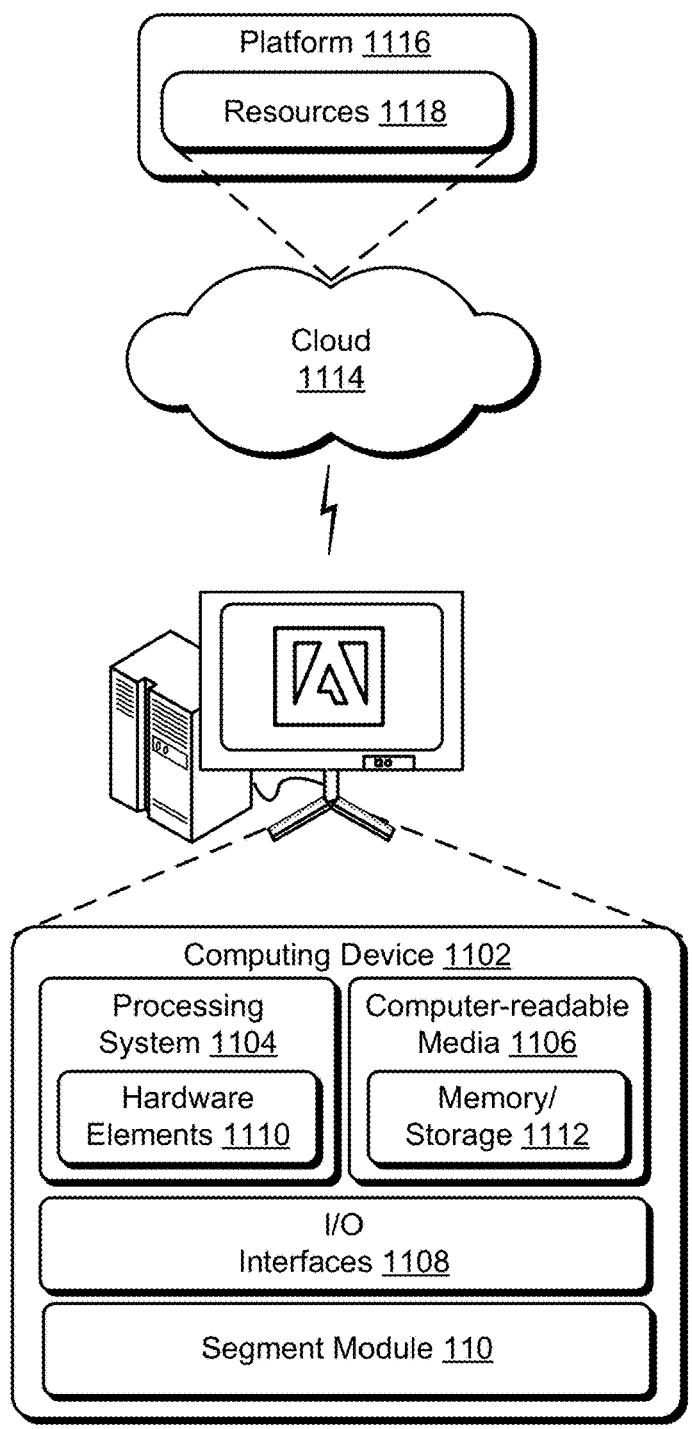
FIG. 11 illustrates an example system that includes an example computing device that is representative of one or more computing systems and/or devices for implementing the various techniques described herein.

FIG. 11 illustrates an example system 1100 that includes an example computing device that is representative of one or more computing systems and/or devices that are usable to implement the various techniques described herein. This is illustrated through inclusion of the segment module 110. The computing device 1102 includes, for example, a server of a service provider, a device associated with a client (e.g., a client device), an on-chip system, and/or any other suitable computing device or computing system.

The example computing device 1102 as illustrated includes a processing system 1104, one or more computer-readable media 1106, and one or more I/O interfaces 1108 that are communicatively coupled, one to another. Although not shown, the computing device 1102 further includes a system bus or other data and command transfer system that couples the various components, one to another. For example, a system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1104 is representative of functionality to perform one or more operations using hardware. Accordingly, the processing system 1104 is illustrated as including hardware elements 1110 that are configured as processors, functional blocks, and so forth. This includes example implementations in hardware as an application specific integrated circuit or other logic device formed using one or more semiconductors. The hardware elements 1110 are not limited by the materials from which they are formed or the processing mechanisms employed therein. For example, processors are comprised of semiconductor(s) and/or transistors (e.g., electronic integrated circuits (ICs)). In such a context, processor-executable instructions are, for example, electronically-executable instructions.

The computer-readable media 1106 is illustrated as including memory/storage 1112. The memory/storage 1112 represents memory/storage capacity associated with one or more computer-readable media. In one example, the memory/storage 1112 includes volatile media (such as random access memory (RAM)) and/or nonvolatile media (such as read only memory (ROM), Flash memory, optical disks, magnetic disks, and so forth). In another example, the memory/storage 1112 includes fixed media (e.g., RAM, ROM, a fixed hard drive, and so on) as well as removable media (e.g., Flash memory, a removable hard drive, an optical disc, and so forth). The computer-readable media 1106 is configurable in a variety of other ways as further described below.

Input/output interface(s) 1108 are representative of functionality to allow a user to enter commands and information to computing device 1102, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which employs visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1102 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are implementable on a variety of commercial computing platforms having a variety of processors.

Implementations of the described modules and techniques are storable on or transmitted across some form of computer-readable media. For example, the computer-readable media includes a variety of media that is accessible to the computing device 1102. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which are accessible to a computer.

"Computer-readable signal media" refers to a signal-bearing medium that is configured to transmit instructions to the hardware of the computing device 1102, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1110 and computer-readable media 1106 are representative of modules, programmable device logic and/or fixed device logic implemented in a hardware form that is employable in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also employable to implement various techniques described herein. Accordingly, software, hardware, or executable modules are implementable as one or more instructions and/or logic embodied on some form of computer-readable storage media and/or by one or more hardware elements 1110. For example, the computing device 1102 is configured to implement particular instructions and/or functions corresponding to the software and/or hardware modules. Accordingly, implementation of a module that is executable by the computing device 1102 as software is achieved at least partially in hardware, e.g., through use of computer-readable storage media and/or hardware elements 1110 of the processing system 1104. The instructions and/or functions are executable/operable by one or more articles of manufacture (for example, one or more computing devices 1102 and/or processing systems 1104) to implement techniques, modules, and examples described herein.

The techniques described herein are supportable by various configurations of the computing device 1102 and are not limited to the specific examples of the techniques described herein. This functionality is also implementable entirely or partially through use of a distributed system, such as over a "cloud" 1114 as described below.

The cloud 1114 includes and/or is representative of a platform 1116 for resources 1118. The platform 1116 abstracts underlying functionality of hardware (e.g., servers) and software resources of the cloud 1114. For example, the resources 1118 include applications and/or data that are utilized while computer processing is executed on servers that are remote from the computing device 1102. In some examples, the resources 1118 also include services provided over the Internet and/or through a subscriber network, such as a cellular or Wi-Fi network.

The platform 1116 abstracts the resources 1118 and functions to connect the computing device 1102 with other computing devices. In some examples, the platform 1116 also serves to abstract scaling of resources to provide a corresponding level of scale to encountered demand for the resources that are implemented via the platform. Accordingly, in an interconnected device embodiment, implementation of functionality described herein is distributable throughout the system 1100. For example, the functionality is implementable in part on the computing device 1102 as well as via the platform 1116 that abstracts the functionality of the cloud 1114.

CONCLUSION

Although implementations of systems for efficient object segmentation have been described in language specific to structural features and/or methods, it is to be understood that the appended claims are not necessarily limited to the specific features or methods described. Rather, the specific features and methods are disclosed as example implementations of systems for efficient object segmentation, and other equivalent features and methods are intended to be within the scope of the appended claims. Further, various different examples are described and it is to be appreciated that each described example is implementable independently or in connection with one or more other described examples.

What is claimed is:

1. A method comprising:
  receiving, by a processing device, a user input based on a single interaction relative to a user interface, the user input specifying coordinates of a digital image;
  computing, by the processing device, receptive fields by a machine learning model based on the coordinates of the digital image, the machine learning model trained on training data to generate segment masks based on one or more objects depicted in training digital images;
  processing, by the processing device, a portion of a feature map of the digital image using the machine learning model based on the receptive fields; and
  generating, by the processing device, a segment mask for an object depicted in the digital image based on processing the portion of the feature map of the digital image using the machine learning model.

2. The method as described in claim 1, wherein the feature map of the digital image is a multi-level feature pyramid generated by processing the digital image using a feature pyramid network.

3. The method as described in claim 1, wherein the portion of the feature map of the digital image represents a portion of the digital image that includes the coordinates of the digital image and the object depicted in the digital image.

4. The method as described in claim 1, wherein the receptive fields are computed using receptive field tracing.

5. The method as described in claim 1, wherein the receptive fields are computed for nodes of layers of the machine learning model.

6. The method as described in claim 5, wherein the receptive fields are computed from a lowest layer of the layers to a highest layer of the layers.

7. The method as described in claim 5, wherein the layers perform layer operations including at least one of activation, convolution, pooling, normalization, or interpolation.

8. The method as described in claim 1, wherein the portion of the feature map of the digital image corresponds to a union of the receptive fields.

9. The method as described in claim 1, wherein the coordinates of the digital image are included in the object depicted in the digital image.

10. A system comprising:
a memory component; and
a processing device coupled to the memory component, the processing device to perform operations comprising:
receiving a user input defining input coordinates of a pixel of a digital image, the pixel included in an object depicted in the digital image;
computing receptive fields for nodes of layers of a machine learning model based on the input coordinates of the pixel;
processing a portion of a feature map of the digital image-using the machine learning model based on the receptive fields for the nodes of the layers, the portion of the feature map corresponding to a union of the receptive fields; and
generating a segment mask for the object based on processing the portion of the feature map of the digital image using the machine learning model.

11. The system as described in claim 10, wherein the receptive fields for the nodes are computed from a lowest layer of the layers to a highest layer of the layers.

12. The system as described in claim 10, wherein the receptive fields for the nodes of the layers are computed using receptive field tracing.

13. The system as described in claim 10, wherein the feature map of the digital image is a multi-level feature pyramid generated by processing the digital image using a feature pyramid network.

14. The system as described in claim 10, wherein the portion of the feature map of the digital image corresponds to a union of the receptive fields for the nodes of the layers.

15. The system as described in claim 10, wherein the coordinates of the digital image are included in the object depicted in the digital image.

16. The system as described in claim 10, wherein the user input is generated based on a single interaction relative to a user interface.

17. A non-transitory computer-readable storage medium storing executable instructions, which when executed by a processing device, cause the processing device to perform operations comprising:
receiving a user input specifying coordinates of a digital image, the coordinates are included in an object depicted in the digital image;
computing receptive fields of a machine learning model based on the coordinates of the digital image, the machine learning model trained on training data to generate segment masks for training objects depicted in training digital images;
processing a portion of a feature map of the digital image using the machine learning model based on the receptive fields; and
generating a segment mask for the object depicted in the digital image based on processing the portion of the feature map of the digital image using the machine learning model.

18. The non-transitory computer-readable storage medium as described in claim 17, wherein the receptive fields are computed using receptive field tracing.

19. The non-transitory computer-readable storage medium as described in claim 17, wherein the user input is generated based on a single interaction relative to a user interface.

20. The non-transitory computer-readable storage medium as described in claim 17, wherein the feature map of the digital image is a multi-level feature pyramid generated by processing the digital image using a feature pyramid network.

\* \* \* \* \*